UNITED STATES PATENT OFFICE.

ERWIN EMIL ALBERT GEORG MEYER, OF NEW BRUNSWICK, NEW JERSEY.

PROCESS OF RECLAIMING DEVULCANIZED RUBBER.

No. 913,218.　　　　Specification of Letters Patent.　　　Patented Feb. 23, 1909.

Application filed April 29, 1908. Serial No. 429,808.

*To all whom it may concern:*

Be it known that I, ERWIN EMIL ALBERT GEORG MEYER, a subject of the German Emperor, residing at New Brunswick, State of New Jersey, have invented certain new and useful Improvements in Processes of Reclaiming Devulcanized Rubber, of which the following is a specification.

The object of my invention is a process of converting rubber by depolymerization into a rubber which possesses practically the properties of natural rubber. By the term "devulcanized rubber" as here used I mean rubber which has once been vulcanized and afterwards subjected to a treatment to remove substantially all the added ingredients.

Rubber in the devulcanized state cannot be used for manufacturing purposes with the same success as natural rubber, but this same devulcanized rubber after it has been subjected to the depolymerizing action of the present invention, assumes again the properties characteristic of natural rubber and can be used in the same manner, and particularly may be revulcanized, with practically the same success as natural rubber.

In the manufacture of rubber articles, beside the sulfur necessary for vulcanization mineral matters of various kinds are added and solidified or oxidized oils and similar substances which are used as rubber substitutes. In the process of devulcanization all the added materials may be separated with comparative ease except the sulfur. According to the modern theory of vulcanization the sulfur enters partly into chemical combination with the rubber while a portion remains as free sulfur, and the vulcanization process itself is considered to be one of polymerization due to the action of the heat and sulfur combined.

The steps and chemicals used in my process differ from all methods and all processes known in the prior art, in that they apparently depolymerize the hydrocarbons of the rubber substance, without any other change or injurious secondary action, and bring them back nearest to the original form of molecular constitution in which they are contained in the natural rubber, for the product obtained in my process can be practically used like natural rubber for all purposes. In order to carry out my process practically I proceed as follows: Rubber waste is cut up into small pieces and mechanically separated from textile fibers and metallic particles. If the textile fiber is so intimately mixed with the rubber that it cannot be separated mechanically, the textile fiber must be removed by a carbonizing process with acids. Whatever is done in this preliminary treatment, the rubber waste should not be affected by a concentrated solution, or high pressure or temperature, and should be practically free from moisture before the subsequent addition of the solvents. The dry and comminuted rubber is then treated with a liquid in a strongly built iron vessel provided with a stirring mechanism and condenser, so that the treatment of the material may be carried on at the boiling point of these liquids. This vessel is also connected with a pump which supplies the necessary liquid from two separate tanks.

For each kilo of waste about six liters of liquid is employed. The quantity is, however, entirely dependent on the kind of waste to be treated. The composition of the liquid also depends upon the grade of waste. In practice I have found the following proportions to act satisfactorily:

2 parts of rubber solvent to 8 parts of acetone
3　"　　"　　"　　　"　　" 7　"　　"　　"
4　"　　"　　"　　　"　　" 6　"　　"　　"

As a rubber solvent I can use phenol, chloroform, naphtha, gasolene, nitro-benzene, mixtures thereof, or other organic solvents for rubber. Instead of acetone I can use ethyl alcohol. The treatment usually lasts from two to five hours according to the material, and the temperature to be employed for the treatment must also be varied accordingly. If such rubber substitutes as factis are present, and it is desired to remove such substances, the following treatment is additionally recommended. An alcoholic solution of caustic soda containing about two to five per cent. of the alkali is added to the rubber waste after the solvents employed in the prior treatment have been removed. Of this solution enough is employed to perfectly cover the rubber waste. The whole mass is then heated for about two to five hours at the boiling point of the alcohol and stirred at the same time. The time of treatment varies with the quality of the rubber waste. The product thus obtained will be a good quality of devulcanized rubber.

Instead of an alcoholic solution of sodium hydroxid, I can also use an alcoholic solution of potassium hydroxid, barium hydroxid, etc.

In order to effect depolymerization the devulcanized rubber is then treated with a neutral soap preferably made from resin which accompanies natural rubber, and is prepared as follows: One hundred kilos of rubber resin are heated with two hundred kilos of water, to which twenty kilos of sodium hydroxid are added; the mass is boiled, and to the boiling liquid five kilos of sodium carbonate are added. For each one hundred kilos of rubber waste treated, ten kilos of resinous soap are taken. Then the rubber is heated with the soap by the admission of steam to a temperature of about 140° to 210° C., and corresponding pressure according to the quality of the material to be treated. During the last stage of the process I subject the rubber mass to a high mechanical pressure, of preferably in excess of about 400 lbs. per square inch, which is produced the best by a hydraulic ram which acts in the inside of the digester. The treatment may last from two to five hours.

For some rubber waste it is advantageous to employ a larger quantity of resinous soap, and good results were obtained by increasing the amount of resinous soap to thirty per cent. of the quantity of the waste rubber used in the process. It has also been found that the resins extracted from some qualities of natural rubber do not easily yield soaps which can be successfully employed in the process of depolymerization. The production of the resinous soap might then advantageously be modified as follows: To one hundred parts of resin ten parts of cocoanut oil are added and this mass is heated with a solution containing ten parts of caustic soda, dissolved in fifty parts of water, and two parts of sodium carbonate, also dissolved in fifty parts of water. To this mixture two hundred parts of water are gradually added until a complete solution is obtained. The resin soap might also be made by melting together the proper amount of resin with alkali in solid form, and dissolved by boiling with water afterwards.

In employing the resinous soap it is of importance to avoid the presence of free alkali. Careful neutralization of the soap is accomplished by adding the requisite amount of a free fatty acid, like oleic acid, or by such acids as acetic acid, or by phenolic compounds, capable of forming salts with alkalies, such as carbolic acid.

Although I have above described an example of carrying out my new process of depolymerizing devulcanized rubber, I do not wish to be understood as excluding equivalents for the ingredients, the apparatus, or the operations employed in the process. It is probable that substitutes may be employed without departing from the scope of the process intended to be secured thereby.

When I use the term "devulcanized rubber" I mean especially rubber waste which has been subjected to a treatment for the removal of sulfur and filling ingredients. Of course, none of such treatments wholly remove the materials added to the rubber, but the free sulfur should be entirely removed before the depolymerizing treatment, in order to secure the full desired effect.

What I claim as new is:

1. The process of depolymerizing devulcanized rubber, which consists in mixing the devulcanized rubber with a neutral resinous soap, subjecting the mixture to the action of heat in excess of 120° C., and, during a portion of the treatment, to mechanical pressure.

2. The process of depolymerizing devulcanized rubber, which consists in mixing devulcanized rubber with a neutral resinous soap, subjecting such mixture to the action of heat in excess of 120° C. and finally to the combined action of the heat and a high mechanical pressure.

3. The process of depolymerizing rubber waste, which consists in first devulcanizing the same by treating it with a mixture of two solvents, the one of which is a rubber solvent, while the other is not, then mixing with the devulcanized rubber a neutral resinous soap and subjecting the mixture to a high mechanical pressure at a temperature in excess of 120° C.

4. The process of depolymerizing rubber waste, which consists in first devulcanizing the same, then mixing with a neutral resinous soap made from the resin of natural rubber and subjecting the mixture to mechanical pressure under the action of heat in excess of 120° C.

5. The process of depolymerizing rubber waste, which consists in first devulcanizing the same by treating it with a mixture of two solvents, the one of which is a rubber solvent, while the other is not, adding an alcoholic solution of a hydroxid possessing a saponifying action, and finally treating the mixture with a neutral soap made from the resin of natural rubber.

6. The process of depolymerizing rubber waste, which consists in first devulcanizing the same by treating it with a mixture of two solvents, the one of which is a rubber solvent, while the other is not, subjecting the devulcanized rubber to the action of an alcoholic solution of a hydroxid possessing a saponifying action, and finally treating the mixture at high temperature with a neutral resinous soap made from the resin of natural rubber and associated with an oil capable of saponification and at the same time effecting upon the solid mixture a high mechanical pressure.

In witness whereof, I have signed my name in the presence of two witnesses.

ERWIN EMIL ALBERT GEORG MEYER.

Witnesses:
H. RICHARD WOBSE,
M. M. QUEENAN.